(12) United States Patent
Lee et al.

(10) Patent No.: US 8,546,469 B2
(45) Date of Patent: Oct. 1, 2013

(54) GLASS FIBER-REINFORCED POLYESTER RESIN COMPOSITION AND MOLDED PRODUCT USING THE SAME

(75) Inventors: Ywan-Hee Lee, Uiwang-si (KR); Doo-Han Ha, Uiwang-si (KR); Jin-Young Huh, Uiwang-si (KR); Young-Seok Chang, Uiwang-si (KR)

(73) Assignee: Cheil Industries Inc., Gumi-si (KR)

( * ) Notice: Subject to any disclaimer, the term of this patent is extended or adjusted under 35 U.S.C. 154(b) by 0 days.

(21) Appl. No.: 12/961,846

(22) Filed: Dec. 7, 2010

(65) Prior Publication Data

US 2011/0144239 A1 Jun. 16, 2011

(30) Foreign Application Priority Data

Dec. 11, 2009 (KR) .................. 10-2009-0123325

(51) Int. Cl.
*C08K 3/40* (2006.01)

(52) U.S. Cl.
USPC ......................................... 523/522

(58) Field of Classification Search
USPC ......................... 523/522; 524/494
See application file for complete search history.

(56) References Cited

U.S. PATENT DOCUMENTS

| | | | | |
|---|---|---|---|---|
| 3,953,394 | A * | 4/1976 | Fox et al. ................ | 524/86 |
| 4,352,907 | A | 10/1982 | Lee | |
| 4,618,633 | A | 10/1986 | Taubitz et al. | |
| 4,803,235 | A | 2/1989 | Okada | |
| 5,061,745 | A | 10/1991 | Wittmann et al. | |
| 5,204,394 | A | 4/1993 | Gosens et al. | |
| 5,219,915 | A * | 6/1993 | McKee et al. ............. | 524/504 |
| 5,614,145 | A * | 3/1997 | O'Kane .................... | 264/458 |
| 5,674,924 | A | 10/1997 | Lee et al. | |
| 5,674,928 | A | 10/1997 | Chisholm et al. | |
| 5,840,798 | A * | 11/1998 | Vollenberg et al. .......... | 524/423 |
| 6,306,941 | B1 | 10/2001 | Klatt et al. | |
| 6,716,900 | B2 | 4/2004 | Jang et al. | |
| 7,786,196 | B2 | 8/2010 | Jung et al. | |
| 7,858,172 | B2 * | 12/2010 | Imaizumi et al. ......... | 428/297.4 |
| 2002/0016410 | A1 | 2/2002 | Katayama et al. | |
| 2004/0058174 | A1 | 3/2004 | Kurian et al. | |
| 2008/0153954 | A1 | 6/2008 | Arpin | |
| 2009/0062436 | A1 | 3/2009 | Breiner | |
| 2009/0203819 | A1 * | 8/2009 | Jung et al. ............... | 524/141 |
| 2009/0209696 | A1 * | 8/2009 | Lee et al. ................ | 524/494 |

FOREIGN PATENT DOCUMENTS

| | | |
|---|---|---|
| CN | 101522764 | 9/2009 |
| EP | 0246620 A2 | 11/1987 |
| JP | 62-268612 | 11/1987 |
| JP | 09-111104 | 4/1997 |
| JP | 10-060241 | 3/1998 |
| JP | 10-060242 | 3/1998 |
| JP | 2000-265001 | 9/2000 |
| JP | 2002-173541 A | 6/2002 |
| JP | 2002-212400 | 7/2002 |
| JP | 2003-226819 A | 8/2003 |
| JP | 2008-013702 | 1/2008 |
| KR | 10-1988-0004915 | 6/1988 |
| KR | 10-1993-0001992 B1 | 3/1993 |
| KR | 1020000057665 | 9/2000 |
| KR | 10-0649512 A | 8/2001 |
| KR | 1020100071000 | 6/2010 |

OTHER PUBLICATIONS

Van Krevelen D.W., Some basic aspects of flame resistance of polymeric materials, Journal of Polymer, Elsevier Science, 1975, vol. 16, pp. 615-620.
International Search Report and Written Opinion in commonly owned International Application No. PCT/KR2006/005849, dated Aug. 22, 2007, pp. 1-7.
Notice of Allowance in commonly owned U.S. Appl. No. 12/430,369 mailed Apr. 29, 2010, pp. 1-7.

* cited by examiner

*Primary Examiner* — Doris Lee
(74) *Attorney, Agent, or Firm* — Summa, Additon & Ashe, P.A.

(57) ABSTRACT

A glass fiber-reinforced polyester resin composition including: (A) about 30 to about 80 wt % of two or more kinds of polyester resin; (B) about 20 to about 70 wt % of a vinyl-based copolymer including an acrylic-based graft copolymer, a rubber modified vinyl-based graft copolymer, a copolymer of aromatic vinyl monomers and unsaturated nitrile monomers, or a combination thereof; and (C) about 10 to about 100 parts by weight of glass fiber, based on about 100 parts by weight of the total amount of the polyester resin (A) and the vinyl-based copolymer (B), wherein the polyester resin includes polyethylene terephthalate resin having crystallinity of about 40% or more, is provided.

6 Claims, No Drawings

GLASS FIBER-REINFORCED POLYESTER RESIN COMPOSITION AND MOLDED PRODUCT USING THE SAME

CROSS REFERENCE TO RELATED APPLICATIONS

This application claims priority to and the benefit of Korean Patent Application No. 10-2009-0123325 filed in the Korean Intellectual Property Office on Dec. 11, 2009, the entire disclosure of which is incorporated herein by reference.

FIELD OF THE INVENTION

The present invention relates to a glass fiber-reinforced polyester resin composition and a molded product made using the same.

BACKGROUND OF THE INVENTION

Polyester resin can have excellent mechanical strength, chemical resistance, electrical characteristics, precision moldability, and the like, as well as a good appearance, and thus is used for various applications. Further, polyester resin can be molded in combination with various forms of inorganic materials to increase mechanical strength, which can expand the ranges of applications for such resins.

However, since polyester resin generally has some degree of crystallinity, molded products made of the same can exhibit significant shrinkage as compared to a non-crystalline resin, and thus there is a need for improved dimensional stability. Dimensional stability of polyester resin can be improved while maintaining the benefits of polyester resin by partially mixing a non-crystalline resin such as a polycarbonate, acrylonitrile-butadiene-styrene (ABS), acrylonitrile-styrene-acrylate (ASA), and the like with polyester resin. For example, ASA resin can be mixed with polyester resin for applications requiring weather resistance.

In addition, although mechanical strength of polyester resin increases in proportion to the content of fillers, specific gravity also increases as the filler content increases and mechanical strength does not increase once the amount of filler exceeds a certain point. This is an obstacle to the expansion of applications for polyester resin, and many studies have attempted to overcome this problem.

Since polyester resin may have good mechanical properties if it is reinforced with glass fiber, it is frequently used as a material for supporting high weight parts in automobiles. However, such material alone does not constitute a product but is assembled with other materials, and since polyester resin which is crystalline has a large shrinkage ratio compared to a non-crystalline resin, dimensional stability of a molded product may differ depending on injection conditions which can cause problems during assembling processes. Therefore, ASA resin that has excellent weather resistance and is non-crystalline and thus is capable of compensating for the drawback of polyester resin can be used as a resin mixed with the polyester resin.

However, the use of many conventional glass fibers can generate a stress difference in the resin according to the arrangement of the glass fiber, which can result in warpage of the resin.

SUMMARY

An exemplary embodiment provides a glass fiber-reinforced polyester resin composition that can have excellent weather resistance, impact resistance, mechanical strength, heat resistance, dimensional stability, workability, appearance, and the like.

Another embodiment provides a molded product made using the glass fiber-reinforced polyester resin composition.

According to one embodiment, the present invention provides a glass fiber-reinforced polyester resin composition including: (A) about 30 to about 80 wt % of two or more kinds of polyester resin; (B) about 20 to about 70 wt % of a vinyl-based copolymer comprising an acrylic-based graft copolymer, a rubber modified vinyl-based graft copolymer, a copolymer of aromatic vinyl monomers and unsaturated nitrile monomers, or a combination thereof; and (C) about 10 to about 100 parts by weight of glass fiber, based on about 100 parts by weight of the total amount of the polyester resin (A) and the vinyl-based copolymer (B), wherein the polyester resin includes polyethylene terephthalate resin having crystallinity of about 40% or more.

The polyethylene terephthalate resin may have crystallinity of about 40 to about 60%.

The polyester resin may further include polytrimethylene terephthalate resin, polybutylene terephthalate resin, polyhexamethylene terephthalate resin, polycyclohexane dimethylene terephthalate resin, a non-crystalline modified polyester resin thereof, or a combination thereof. In exemplary embodiments, the polyester resin may include about 10 to about 40 wt % of the polyethylene terephthalate resin and about 60 to about 90 wt % of the polybutylene terephthalate resin, and the polyethylene terephthalate resin and the polybutylene terephthalate resin may have a weight ratio of about 1:2 to about 1:5.

The acrylic-based graft copolymer may include a copolymer in which a polymer of aromatic vinyl monomers and unsaturated nitrile monomers is grafted onto an acrylic-based rubber.

The rubber modified vinyl-based graft copolymer may include a copolymer in which about 5 to about 95 wt % of a vinyl-based polymer including about 50 to about 95 wt % of a first vinyl-based monomer comprising an aromatic vinyl monomer, an acrylic-based monomer, a heterocyclic monomer, or a combination thereof, and about 5 to about 50 wt % of a second vinyl-based monomer comprising an unsaturated nitrile monomer, an acrylic-based monomer that is different from the acrylic-based monomer of the first vinyl-based monomer, a heterocyclic monomer that is different from the heterocyclic monomer of the first vinyl-based monomer, or a combination thereof, is grafted onto about 5 to about 95 wt % of a rubbery polymer comprising butadiene rubber, acrylic rubber, ethylene/propylene rubber, styrene/butadiene rubber, acrylonitrile/butadiene rubber, isoprene rubber, ethylene-propylene-diene terpolymer (EPDM) rubber, a polyorganosiloxane/polyalkyl(meth)acrylate rubber composite, or a combination thereof.

The glass fiber may have a cross-sectional aspect ratio of less than about 1.5.

The glass fiber-reinforced polyester resin composition may further include one or more additives comprising an antibacterial agent, a heat stabilizer, an antioxidant, a release agent, a light stabilizer, a compatibilizer, an inorganic material additive, a surfactant, a coupling agent, a plasticizer, an admixture, a lubricant, an antistatic agent, a flame-proofing agent, a weather-resistance agent, a colorant, an ultraviolet (UV) blocking agent, a filler, a nucleating agent, an adhesion aid, an adhesive, or a combination thereof.

According to another embodiment, a molded product made using the glass fiber-reinforced polyester resin composition is provided.

Hereinafter, further aspects of the present invention will be described in detail.

Because the glass fiber-reinforced polyester resin composition of the invention may have excellent weather resistance, impact resistance, mechanical strength, heat resistance, dimensional stability, workability, appearance, and the like, it may be usefully applied for various products such as automobile exterior and interior materials, various precision parts such as in an engine room and the like, and electrical and electronic parts and the like.

DETAILED DESCRIPTION

The present invention will be described more fully hereinafter in the following detailed description of the invention, in which some but not all embodiments of the invention are described. Indeed, this invention may be embodied in many different forms and should not be construed as limited to the embodiments set forth herein; rather, these embodiments are provided so that this disclosure will satisfy applicable legal requirements.

As used herein, unless a specific definition is otherwise provided, the term "(meth)acrylate" refers to "acrylate" and "methacrylate". The term "(meth)acrylic acid alkyl ester" refers to "acrylic acid alkyl ester" and "methacrylic acid alkyl ester", and the term "(meth)acrylic acid ester" refers to "acrylic acid ester" and "methacrylic acid ester".

The glass fiber-reinforced polyester resin composition according to one embodiment includes (A) two or more kinds of polyester resin, (B) a vinyl-based copolymer comprising an acrylic-based graft copolymer, a rubber modified vinyl-based graft copolymer, a copolymer of aromatic vinyl monomers and unsaturated nitrile monomers, or a combination thereof, and (C) a glass fiber.

Exemplary components included in the glass fiber-reinforced polyester resin composition according to one embodiment will hereinafter be described in detail.

(A) Polyester Resin

The polyester resin (A) can be an aromatic polyester resin produced in accordance with known processes, such as condensation melt polymerization of terephthalic acid or terephthalic acid alkyl ester and a glycol component having 2 to 10 carbon atoms. As used herein with reference to the terephthalic acid alkyl ester, the term alkyl refers to a C1 to C10 alkyl.

According to one embodiment, two or more kinds of polyester resin are used, and one of them is polyethylene terephthalate resin.

The polyethylene terephthalate resin may have crystallinity of about 40% or more, for example about 40 to about 60%. In some embodiments, the polyethylene terephthalate resin may have crystallinity of about 40, 41, 42, 43, 44, 45, 46, 47, 48, 49, 50, 51, 52, 53, 54, 55, 56, 57, 58, 59, or 60%. Further, according to some embodiments of the present invention, the crystallinity of the polyethylene terephthalate resin can be in a range from about any of the foregoing amounts to about any other of the foregoing amounts.

If the polyethylene terephthalate resin has crystallinity within the above range, excellent dimensional stability and appearance, as well as mechanical strength, impact resistance, heat resistance, and workability, may be maintained.

The crystallinity indicates a weight fraction of crystal parts to the total amount of the polyethylene terephthalate resin. The crystallinity may be determined using known techniques, such as by measuring the heat of fusion by DSC (differential scanning calorimetry), identifying the presence or absence of crystal with a diffraction degree difference between crystal and non-crystal by X-ray diffraction, or measuring IR absorption strength difference between crystal and non-crystal by infrared (IR) spectrum.

According to one embodiment, in addition to the polyethylene terephthalate resin, other kinds of polyester resin may be used, examples of which may include without limitation polytrimethylene terephthalate resin, polybutylene terephthalate resin, polyhexamethylene terephthalate resin, polycyclohexane dimethylene terephthalate resin, a non-crystalline modified polyester resin thereof, and the like, alone or in a combination thereof. In exemplary embodiments, polytrimethylene terephthalate resin, polybutylene terephthalate resin, non-crystalline polyethylene terephthalate resin, or a combination thereof may be used.

The polyester resin may have specific gravity of about 1.15 to about 1.4 $g/cm^3$, and a melting point of about 210 to about 280° C. If the polyester resin has an inherent viscosity, specific gravity, and melting point within the above ranges, excellent mechanical properties and moldability may be secured.

A specific example of the polyester resin according to one embodiment may include a mixture of polyethylene terephthalate resin and polybutylene terephthalate resin. The mixture can include about 10 to about 40 wt % of the polyethylene terephthalate resin and about 60 to about 90 wt % of the polybutylene terephthalate resin.

In some embodiments, the polyester mixture may include the polyethylene terephthalate resin in an amount of about 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, or 40 wt %. Further, according to some embodiments of the present invention, the amount of the polyethylene terephthalate resin can be in a range from about any of the foregoing amounts to about any other of the foregoing amounts.

In some embodiments, the polyester mixture may include the polybutylene terephthalate resin in an amount of about 60, 61, 62, 63, 64, 65, 66, 67, 68, 69, 70, 71, 72, 73, 74, 75, 76, 77, 78, 79, 80, 81, 82, 83, 84, 85, 86, 87, 88, 89, or 90 wt %. Further, according to some embodiments of the present invention, the amount of the polybutylene terephthalate resin can be in a range from about any of the foregoing amounts to about any other of the foregoing amounts.

The polyethylene terephthalate resin and the polybutylene terephthalate resin may be used in a weight ratio of about 1:2 to about 1:5.

If the polyethylene terephthalate resin and the polybutylene terephthalate resin are used in an amount within the above ratio, excellent mechanical strength, heat resistance, and workability may be obtained.

The glass fiber-reinforced polyester resin composition of the invention may include the polyester resin (A) in an amount of about 30 to about 80 wt %, for example about 50 to about 70 wt %, based on the total amount of the polyester resin (A) and the vinyl-based copolymer (B). In some embodiments, the glass fiber-reinforced polyester resin composition of the invention may include the polyester resin (A) in an amount of about 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, or 80 wt %. Further, according to some embodiments of the present invention, the amount of the polyester resin (A) can be in a range from about any of the foregoing amounts to about any other of the foregoing amounts. If the polyester resin is included in an amount within the above range, excellent mechanical strength and impact resistance may be secured.

(B) Vinyl-based Copolymer

The vinyl-based copolymer according to one embodiment may include an acrylic-based graft copolymer, a rubber modified vinyl-based graft copolymer, a copolymer of aromatic vinyl monomers and unsaturated nitrile monomers, or a combination thereof.

The acrylic-based graft copolymer is a copolymer in which a polymer of aromatic vinyl monomers and unsaturated nitrile monomers is grafted onto an acrylic-based rubber.

The acrylic-based rubber may include (meth)acrylic acid alkyl ester monomer, (meth)acrylic acid ester monomer, or a combination thereof. As used herein with reference to the (meth)acrylic acid alkyl ester monomer, the term alkyl refers to C1 to C10 alkyl. Examples of the (meth)acrylic acid alkyl ester monomer may include without limitation methyl(meth)acrylate, ethyl(meth)acrylate, butyl(meth)acrylate, and the like, and combinations thereof. Examples of the (meth)acrylic acid ester monomer may include (meth)acrylate and the like, and combinations thereof.

Examples of the aromatic vinyl monomer may include without limitation styrene, o-ethyl styrene, m-ethyl styrene, p-ethyl styrene, α-methyl styrene, and the like, and combinations thereof.

Examples of the unsaturated nitrile monomer may include without limitation acrylonitrile, methacrylonitrile, ethacrylonitrile, and the like, and combinations thereof.

A specific example of the acrylic-based graft copolymer may include a polymer of styrene and acrylonitrile grafted onto (meth)acrylate rubber.

The rubber modified vinyl-based graft copolymer is a copolymer in which about 5 to about 95 wt % of a vinyl-based polymer is grafted onto about 5 to about 95 wt % of a rubbery polymer.

In some embodiments, the rubber modified vinyl-based graft copolymer may include the vinyl-based polymer in an amount of about 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, 80, 81, 82, 83, 84, 85, 86, 87, 88, 89, 90, 91, 92, 93, 94, or 95 wt %. Further, according to some embodiments of the present invention, the amount of the vinyl-based polymer can be in a range from about any of the foregoing amounts to about any other of the foregoing amounts.

In some embodiments, the rubber modified vinyl-based graft copolymer may include the rubbery polymer in an amount of about 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, 80, 81, 82, 83, 84, 85, 86, 87, 88, 89, 90, 91, 92, 93, 94, or 95 wt %. Further, according to some embodiments of the present invention, the amount of the rubbery polymer can be in a range from about any of the foregoing amounts to about any other of the foregoing amounts.

The vinyl-based polymer can include a polymer consisting of about 50 to about 95 wt % of a first vinyl-based monomer comprising an aromatic vinyl monomer, an acrylic-based monomer, a heterocyclic monomer, or a combination thereof, and about 5 to about 50 wt % of a second vinyl-based monomer comprising an unsaturated nitrile monomer, an acrylic-based monomer that is different from the acrylic-based monomer of the first vinyl-based monomer, a heterocyclic monomer that is different from the heterocyclic monomer of the first vinyl-based monomer, or a combination thereof may be used. The term "different" means a different kind from each other.

In some embodiments, the vinyl-based polymer may include the first vinyl-based monomer in an amount of about 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, 80, 81, 82, 83, 84, 85, 86, 87, 88, 89, 90, 91, 92, 93, 94, or 95 wt %. Further, according to some embodiments of the present invention, the amount of the first vinyl-based monomer can be in a range from about any of the foregoing amounts to about any other of the foregoing amounts.

In some embodiments, the vinyl-based polymer may include the second vinyl-based monomer in an amount of about 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, or 50 wt %. Further, according to some embodiments of the present invention, the amount of the second vinyl-based monomer can be in a range from about any of the foregoing amounts to about any other of the foregoing amounts.

Examples of the aromatic vinyl monomer may include without limitation styrene, C1 to C10 alkyl-substituted styrenes, halogen-substituted styrenes, and the like, and combinations thereof. Specific examples of the alkyl substituted styrene may include without limitation o-ethyl styrene, m-ethyl styrene, p-ethyl styrene, α-methyl styrene, and the like, and combinations thereof.

Examples of the acrylic-based monomer may include without limitation (meth)acrylic acid alkyl esters, (meth)acrylic acid esters, and the like, and combinations thereof. As used herein with reference to the (meth)acrylic acid alkyl ester, the term alkyl refers to a C1 to C10 alkyl. Specific examples of the (meth)acrylic acid alkyl ester may include without limitation methyl(meth)acrylate, ethyl(meth)acrylate, propyl(meth)acrylate, butyl(meth)acrylate, and the like, and combinations thereof. In exemplary embodiments, the (meth)acrylic acid alkyl ester can include methyl(meth)acrylate.

Examples of the heterocyclic monomer may include without limitation maleic anhydride, C1-C10 alkyl- or phenyl-N-substituted maleimide, and the like, and combinations thereof.

Examples of the unsaturated nitrile monomer may include without limitation acrylonitrile, methacrylonitrile, ethacrylonitrile, and the like, and combinations thereof.

Examples of the rubbery polymer may include without limitation butadiene rubber, acrylic rubber, ethylene/propylene rubber, styrene/butadiene rubber, acrylonitrile/butadiene rubber, isoprene rubber, ethylene-propylene-diene terpolymer (EPDM) rubber, a polyorganosiloxane/polyalkyl(meth)acrylate rubber composite, and the like, and combinations thereof.

When preparing the rubber modified vinyl-based graft copolymer, to improve impact resistance and surface characteristics of a molded product, the rubber particle may have a particle diameter of about 0.05 to about 4 μm. If the rubber particle has a particle diameter within the above range, excellent impact strength may be secured.

The rubber modified vinyl-based graft copolymer may be used alone or in a mixture of two or more kinds thereof.

A specific example of the rubber modified vinyl-based graft copolymer may include a copolymer obtained by graft copolymerization of styrene, acrylonitrile, and selectively methyl(meth)acrylate in a mixture onto butadiene rubber, acrylic rubber, or styrene/butadiene rubber.

Another specific example of the rubber modified vinyl-based graft copolymer may include a copolymer obtained by graft copolymerization of methyl(meth)acrylate onto butadiene rubber, acrylic rubber, or styrene/butadiene rubber.

A more specific example of the rubber modified graft copolymer may include an acrylonitrile-butadiene-styrene graft copolymer.

Methods of preparing the rubber modified vinyl-based graft copolymer are well known to a person with ordinary skill in the art, and any suitable method may be used, such as emulsion polymerization, suspension polymerization, solution polymerization, or bulk polymerization Specific examples of the method may include emulsion-polymerization or bulk-polymerization of the above-described aromatic vinyl monomers in the presence of a rubbery polymer using a polymerization initiator.

Exemplary aromatic vinyl monomers useful for the copolymer of an aromatic vinyl monomer and an unsaturated nitrile monomer include without limitation styrene, C1 to C10 alkyl substituted styrenes, halogen substituted styrenes, and the like, and combinations thereof. Examples of the alkyl substituted styrene may include without limitation o-ethyl styrene, m-ethyl styrene, p-ethyl styrene, α-methyl styrene, and the like, and combinations thereof. Examples of the unsaturated nitrile monomer include without limitation acrylonitrile, methacrylonitrile, ethacrylonitrile, and the like, and combinations thereof.

An exemplary copolymer of aromatic vinyl monomer and unsaturated nitrile monomer may include without limitation a copolymer of styrene and acrylonitrile.

According to one embodiment, a mixture of the acrylic-based graft copolymer and the copolymer of aromatic vinyl monomers and unsaturated nitrile monomers may be used, and the mixture may be referred to as ASA (acrylonitrile-styrene-acrylate) resin. In exemplary embodiments, the ASA resin can include about 20 to about 50 wt % of the acrylic-based graft copolymer and about 50 to about 80 wt % of the copolymer of aromatic vinyl monomers and unsaturated nitrile monomers.

In some embodiments, the ASA resin may include the acrylic-based graft copolymer in an amount of about 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, or 50 wt %. Further, according to some embodiments of the present invention, the amount of the acrylic-based graft copolymer can be in a range from about any of the foregoing amounts to about any other of the foregoing amounts.

In some embodiments, the ASA resin may include the copolymer of aromatic vinyl monomers and unsaturated nitrile monomers in an amount of about 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, or 80 wt %. Further, according to some embodiments of the present invention, the amount of the copolymer of the aromatic vinyl monomers and unsaturated nitrile monomers can be in a range from about any of the foregoing amounts to about any other of the foregoing amounts.

If the acrylic-based graft copolymer and the copolymer of aromatic vinyl monomers and unsaturated nitrile monomers are mixed within the above ratio, physical properties such as fluidity, dimensional stability, and the like may be balanced.

The glass fiber-reinforced polyester resin composition of the invention may include the vinyl-based copolymer in an amount of about 20 to about 70 wt %, for example about 30 to about 50 wt %, based on the total amount of the polyester resin (A) and the vinyl-based copolymer (B). In some embodiments, the glass fiber-reinforced polyester resin composition of the invention may include the vinyl-based copolymer (B) in an amount of about 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, or 70 wt %. Further, according to some embodiments of the present invention, the amount of the vinyl-based copolymer (B) can be in a range from about any of the foregoing amounts to about any other of the foregoing amounts. If the vinyl-based copolymer is included in an amount within the above range, excellent compatibility may be obtained thus reducing deviation in physical properties, and excellent heat resistance may be secured.

(C) Glass Fiber

Commonly used glass fibers may be used, and the glass fibers may have a diameter of about 8 to about 20 μm and a length of about 1.5 to about 8 mm. If the glass fiber has a diameter within the above range, an excellent impact modifying effect may be obtained, and if the glass fiber has a length within the above range, it may be easily introduced into an extruder and the impact modifying effect may be largely improved.

The glass fiber may be used in a mixture with a carbon fiber, a basalt fiber, a fiber made from biomass, or a combination thereof. The term "biomass" refers to an organic material using plant or microorganisms and the like as an energy source.

The glass fiber may have a circular, oval, rectangular, or a bicircularly-connected dumbbell-shaped cross-section. Further, the glass fiber may have a cross-sectional aspect ratio of less than about 1.5, for example a cross-sectional aspect ratio of about 1. The aspect ratio is defined as a ratio of the longest diameter to the smallest diameter in the cross-section of the glass fiber. If the glass fiber having a cross-sectional aspect ratio within the above range is used, unit cost of production may be lowered, and dimensional stability and appearance may be improved using a glass fiber having circular cross-section.

To prevent a reaction of the polyester resin and improve impregnation rate, the glass fiber may be treated with a predetermined glass fiber treating agent. The treatment of the glass fiber may be performed during preparation of the fiber or in a post-processing step.

Examples of the glass fiber treating agent may include without limitation lubricants, coupling agents, surfactants, and the like. The lubricant can be used during glass fiber preparation to form a strand having a constant diameter and thickness, and the coupling agent can provide good adhesion of the glass fiber to resin. The glass fiber reinforced material may have good physical properties with the selection of various glass fiber treating agents according to the kinds of resin and glass fiber used.

The glass fiber-reinforced polyester resin composition of the invention may include the glass fiber in an amount of about 10 to about 100 parts by weight, for example about 20 to about 80 parts by weight, based on about 100 parts by weight of the total amount of the polyester resin (A) and the vinyl-based copolymer (B). In some embodiments, the glass fiber-reinforced polyester resin composition of the invention may include the glass fiber in an amount of about 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, 80, 81, 82, 83, 84, 85, 86, 87, 88, 89, 90, 91, 92, 93, 94, 95, 96, 97, 98, 99, or 100 parts by weight. Further, according to some embodiments of the present invention, the amount of the glass fiber can be in a range from about any of the foregoing amounts to about any other of the foregoing amounts. If the glass fiber is included in an amount within the above range, the glass fiber reinforced polyester resin may have improved flexural strength and heat resistance, and excellent flowability thus securing excellent moldability.

(D) Other Additive

The glass fiber-reinforced polyester resin composition according to one embodiment may further include one or more additives.

Examples of the additive may include without limitation antibacterial agents, heat stabilizers, antioxidants, release agents, light stabilizers, compatibilizers, inorganic material additives, surfactants, coupling agents, plasticizers, admixtures, lubricants, antistatic agents, flame-proofing agents, weather-resistance agents, colorants, ultraviolet (UV) blocking agents, filler, nucleating agents, adhesion aids, adhesives, and the like, and combinations thereof.

Examples of the antioxidant may include without limitation phenol-type antioxidants, phosphite-type antioxidants, thioether-type antioxidants, amine-type antioxidants, and the like, and combinations thereof. Examples of the release agent may include without limitation fluorine-including polymers, silicone oils, metal salts of stearic acid, metal salts of montanic acid, montanic acid ester waxes, polyethylene waxes, and the like, and combinations thereof. Examples of the weather-resistance agent may include without limitation benzophenone-type weather-resistance agents, amine-type weather-resistance agents, and the like, and combinations thereof. Examples of the colorant may include without limitation dyes, pigment, and the like, and combinations thereof. Examples of the ultraviolet (UV) blocking agent may include without limitation titanium dioxide ($TiO_2$), carbon black, and the like, and combinations thereof. Examples of the filler may include without limitation glass fiber, carbon fiber, silica, mica, alumina, clay, calcium carbonate, calcium sulfate, glass beads, and the like, and combinations thereof. The filler may improve properties such as mechanical strength and heat resistance. Examples of the nucleating agent may include without limitation talc, clay, and the like, and combinations thereof.

The glass fiber-reinforced polyester resin composition of the invention may include the additive(s) in an amount of about 50 parts by weight or less, based on about 100 parts by weight of the total amount of the polyester resin (A) and the vinyl-based copolymer (B). If the additive(s) is included in an amount within the above range, the effects of the additive may be realized, and excellent mechanical properties and improved surface appearance may be obtained.

A glass fiber-reinforced polyester resin composition according to one embodiment may be prepared using a generally-known method. For example, the above-described components and additives can be mixed and then melt-extruded in an extruder to prepare the glass fiber-reinforced polyester resin composition in the form of pellets.

According to another embodiment, a molded product prepared using the glass fiber-reinforced polyester resin composition of the invention is provided. The molded products of the invention can exhibit various benefits due to the addition of glass fiber, such as improved tensile strength and flexural strength, and excellent heat resistance, and thus the products may be suitably used for a part that is continuously under load or that should withstand continuous heat. Further, the molded products of the invention may have excellent dimensional stability and appearance, and thus painting processes may be omitted to provide a cost reduction. The molded products of the invention may be used for various products such as automobile exterior and interior materials, precision parts such as for in an engine room and the like, and electric and electronic parts and the like.

The following examples illustrate the present invention in more detail. However, it is understood that this invention is not limited by these examples.

EXAMPLES

A glass fiber-reinforced polyester resin composition according to one embodiment includes each component as follows.

(A) Polyester Resin (A-1) Polyethylene terephthalate (PET) resin:

(A-1-1) Polyethylene terephthalate having a crystallinity of 45%, available under the name SKYPET 1100 from SK Chemicals, is used.

(A-1-2) Polyethylene terephthalate having a crystallinity of 30%, available under the name SKYPET BR8040 from SK Chemicals, is used.

The crystallinity is determined by measuring the heat of fusion using DSC (differential scanning calorimetry).

(A-2) A polybutylene terephthalate (PBT) resin available under the name DHK002 from SHINKONG Corporation is used.

(B) Vinyl-based Copolymer

A mixture of a copolymer (B-1), in which a polymer of styrene and acrylonitrile is grafted onto acrylate rubber, and a copolymer (B-2) of styrene and acrylonitrile, i.e., ASA (acrylonitrile-styrene-acrylate) resin, is used.

(C) Glass Fiber

CS08-183F from Owens Corning Corporation having a length of about 3 mm and a diameter of about 13 μm is used.

Examples 1 to 4 and Comparative Examples 1 to 6

The above-described components are mixed in the amounts as shown in the following Table 1, and pelletized using a twin-screw extruder having φ=45 mm. At this time, the polyester resin and the vinyl-based copolymer are added to a main feeder, and the glass fiber is added to a side feeder.

Experimental Examples

The pellets prepared according to the Examples 1 to 4 and Comparative Examples 1 to 6 are dried at about 110° C. for about 3 hours or more, and then injected at an injection temperature of about 200 to 300° C. and mold temperature of about 60 to 100° C. in a 10 oz injector to prepare specimens. Physical properties of the prepared specimens are measured by the following methods, and the results are described in the following Table 1.

(1) Flexural strength: Flexural strength is measured according to ASTM 790.

(2) Flexural modulus: Flexural modulus is measured according to ASTM 790.

(3) Tensile strength: Tensile strength is measured according to ASTM D638.

(4) Impact strength: Impact strength is measured according to ASTM D256 (¼", notched).

(5) Fluidity: Melt fluidity is measured according to ASTM D 1238, which is a U.S. standard method for measuring fluidity of thermoplastic resin using an extrusion plastometer. Measurement temperature is about 250° C., a 5 kg weight is used, and mass of resin flowing out for 1 minute is measured.

(6) Heat resistance: Heat resistance is measured according to ASTM D648.

(7) Shrinkage ratio (TD): A film gate mold having of about a 6"×6" size and about ⅛" thickness is maintained at about 80° C., the specimens are injected in a 10 oz injector with 95% power and then allowed to stand in a thermo-hygrostat chamber of temperature of about 23° C. and moisture of about 50% for about 24 hours under no external force applied condition, and shrinkage ratio of TD (transverse direction) perpendicular to flow is measured and indicated as a % unit.

(8) Appearance: The specimens are injected using a mold (5"×8" size of color chip specimen) from Cheil Industries Inc. and visually evaluated.
O: Superior (smooth surface)
Δ: fair (moderately rough surface)
X: Inferior (extremely rough surface)

TABLE 1

|  |  |  | Examples |  |  |  | Comparative Examples |  |  |  |  |  |
|---|---|---|---|---|---|---|---|---|---|---|---|---|
|  |  |  | 1 | 2 | 3 | 4 | 1 | 2 | 3 | 4 | 5 | 6 |
| (A) polyester resin | (A-1) PET resin (wt %) | (A-1-1) | 9 | 10 | 12 | 15 | — | — | — | — | — | — |
|  |  | (A-1-2) | — | — | — | — | — | 5 | 10 | 20 | 30 | — |
|  | (A-2) PBT resin (wt %) |  | 41 | 40 | 38 | 35 | 50 | 45 | 40 | 30 | 20 | — |
| (B) vinyl-based copolymer | (B-1) (wt %) |  | 5 | 5 | 5 | 5 | 5 | 5 | 5 | 5 | 5 | 23 |
|  | (B-2) (wt %) |  | 15 | 15 | 15 | 15 | 15 | 15 | 15 | 15 | 15 | 47 |
| (C) glass fiber (wt %) |  |  | 30 | 30 | 30 | 30 | 30 | 30 | 30 | 30 | 30 | 30 |
| Flexural strength (kgf/cm$^2$) |  |  | 1680 | 1600 | 1500 | 1560 | 1600 | 1600 | 1650 | 1720 | 1780 | 1510 |
| Flexural modulus (kgf/cm$^2$) |  |  | 84000 | 83000 | 84000 | 85000 | 82000 | 81000 | 83000 | 83500 | 85000 | 75000 |
| Tensile strength (kgf/cm$^2$) |  |  | 1180 | 1200 | 1300 | 1500 | 1200 | 1100 | 1090 | 1070 | 1150 | 1000 |
| Impact strength (kgf·cm/cm) |  |  | 5.5 | 6.0 | 6.1 | 6.1 | 6.0 | 5.8 | 5.5 | 5.1 | 5.0 | 5.1 |
| Fluidity (g/1 minute) |  |  | 33 | 30 | 27 | 25 | 28 | 25 | 22 | 21 | 18 | 35 |
| Heat resistance (° C.) |  |  | 198 | 195 | 185 | 180 | 194 | 190 | 184 | 178 | 168 | 120 |
| Shrinkage ratio (TD) (%) |  |  | 0.73 | 0.70 | 0.67 | 0.65 | 0.90 | 0.85 | 0.82 | 0.81 | 0.79 | 0.65 |
| Appearance |  |  | O | O | O | O | X | Δ | Δ | Δ | Δ | O |

From the data in Table 1, Examples 1 to 4 which include polyethylene terephthalate resin having a crystallinity of about 40% or more together with other kinds of polyester resin, a vinyl-based copolymer, and glass fiber exhibit excellent dimensional stability and appearance as well as excellent mechanical strength, impact resistance, heat resistance, and workability, compared to Comparative Example 1 in which polyethylene terephthalate resin is not used, Comparative Examples 2 to 5 in which polyethylene terephthalate resin having a crystallinity that does not fall within the range of the invention is used, and Comparative Example 6 in which polyester resin is not used.

Many modifications and other embodiments of the invention will come to mind to one skilled in the art to which this invention pertains having the benefit of the teachings presented in the foregoing description. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation, the scope of the invention being defined in the claims.

What is claimed is:

1. A glass fiber-reinforced polyester resin composition including:
(A) about 30 to about 80 wt % of two or more kinds of polyester resin;
(B) about 20 to about 70 wt % of a vinyl-based copolymer comprising an acrylic-based graft copolymer or a mixture of the acrylic-based graft copolymer and a copolymer of aromatic vinyl monomers and unsaturated nitrile monomers; and
(C) about 10 to about 100 parts by weight of glass fiber, based on about 100 parts by weight of the total amount of the polyester resin (A) and the vinyl-based copolymer (B),
wherein the polyester resin (A) includes polyethylene terephthalate resin having a crystallinity of about 40% to about 60% and polybutylene terephthalate resin; and
wherein the polyester resin (A) includes about 10 to about 40% of the polyethylene terephthalate resin and about 60% to about 90% of the polybutylene terephthalate resin;
wherein the acrylic-based graft copolymer is a copolymer in which a polymer of aromatic vinyl monometers and unsaturated nitrile monomers is grafted onto an acrylic-based rubber; and
wherein the composition has a fluidity of 25 to 33 g/1 min measured in accordance with ASTM D1238 and a shrinkage ratio (TD) of 0.65 to 0.73%.

2. The glass fiber-reinforced polyester resin composition of claim 1, wherein the polyester resin further includes polytrimethylene terephthalate resin, polybutylene terephthalate resin, polyhexamethylene terephthalate resin, polycyclohexane dimethylene terephthalate resin, a non-crystalline modified polyester resin thereof, or a combination thereof.

3. The glass fiber-reinforced polyester resin composition of claim 1, wherein the polyethylene terephthalate resin and the polybutylene terephthalate resin have a weight ratio of about 1:2 to about 1:5.

4. The glass fiber-reinforced polyester resin composition of claim 1, wherein the glass fiber has a cross-sectional aspect ratio of less than about 1.5.

5. The glass fiber-reinforced polyester resin composition of claim 1, wherein the glass fiber-reinforced polyester resin composition further includes an additive comprising an antibacterial agent, a heat stabilizer, an antioxidant, a release agent, a light stabilizer, a compatibilizer, an inorganic material additive, a surfactant, a coupling agent, a plasticizer, an admixture, a lubricant, an antistatic agent, a flame-proofing agent, a weather-resistance agent, a colorant, an ultraviolet (UV) blocking agent, a filler, a nucleating agent, an adhesion aid, an adhesive, or a combination thereof.

6. A molded product made using the glass fiber-reinforced polyester resin composition of claim 1.

* * * * *

UNITED STATES PATENT AND TRADEMARK OFFICE
CERTIFICATE OF CORRECTION

PATENT NO.       : 8,546,469 B2                           Page 1 of 1
APPLICATION NO.  : 12/961846
DATED            : October 1, 2013
INVENTOR(S)      : Ywan-Hee Lee et al.

It is certified that error appears in the above-identified patent and that said Letters Patent is hereby corrected as shown below:

In the Claims:

Claim 1, Column 12, Line 36 reads: "40 % of the polyethylene terephthalate resin and about" and should read: "40 wt% of the polyethylene terephthalate resin and about"

Claim 1, Column 12, Line 37 reads: "60 to about 90% of the polybutylene terephthalate" and should read: "60 to about 90 wt% of the polybutylene terephthalate"

Claim 1, Column 12, Line 40 reads: "in which a polymer of aromatic vinyl monometers and" and should read: "in which a polymer of aromatic vinyl monomers and"

Signed and Sealed this
Seventeenth Day of December, 2013

Margaret A. Focarino
*Commissioner for Patents of the United States Patent and Trademark Office*